SYSTEM FOR MAINTAINING FIXED PHASE BETWEEN A PAIR OF REMOTELY LOCATED STATIONS

Filed June 12, 1962

INVENTORS
SAMUEL B. BOOR
& ROBERT J. WOHLERS

Hurwitz & Rose

ATTORNEYS

United States Patent Office 3,230,453

Patented Jan. 18, 1966

3,230,453

SYSTEM FOR MAINTAINING FIXED PHASE BETWEEN A PAIR OF REMOTELY LOCATED STATIONS

Samuel B. Boor, Orlando, Fla., and Robert J. Wohlers, Orchard Park, N.Y., assignors to Radiation, Incorporated, Melbourne, Fla., a corporation of Florida Filed June 12, 1962, Ser. No. 201,938
16 Claims. (Cl. 325—67)

The present invention relates generally to a transmitting and receiving system and more particularly to a system for transmitting and receiving energy between remotely located stations wherein the energy received at one of the stations is of constant, finite, fixed phase relative to that supplied to the other station.

In the past, in order to obtain a relative phase coherence between widely separated points, ultra stable oscillators have been employed. These oscillators supply energy into transmission lines or wave guides which must be carefully controlled in order to obtain the desired fixed phase results. In order to obtain constant, fixed phase between stations, the transmission path must consist of an air conditioned wave guide in one approach employed previously. The use of air conditioned wave guides is deleterious because of the necessity of permanent installations which require long assembly time and high costs. The employment of carefully controlled transmission lines between remotely located stations is frequently not possible where the terrain is difficult, thus almost eliminating the possibility of obtaining relative phase coherence between widely separated stations. An attempt at very accurately modulating a carrier wave with an intelligence bearing signal has not proven satisfactory at high frequencies because of the inability to maintain constant phase of the carrier and beat frequencies.

The present invention provides a fixed, finite phase difference between first and second remotely located stations by employing a transmitter and receiver at each station. The transmitter and receiver at each station exchange energy between each other to maintain the desired phase relationship. At the first station, a reference signal is generated having frequency and phase components proportional to the difference in frequency and phase between the signal received from the second station and the signal transmitted from the first station. This signal together with an information or independent input signal are supplied to a phase locked loop which controls the frequency and phase components of the signal transmitted from the first station.

The second station is responsive to the signal received from the first station and a further independent signal of a predetermined frequency. The independent signal of the second station is termed an offset frequency signal since its value is commensurate with the desired phase and frequency difference between the signal received and transmitted by the second station. The offset signal and the signal received by the second station are combined in a phase lock loop to derive the signal transmitted from the second station back to the first station. The frequency and phase components of this signal, which is the fixed phase output at the second station, equal those of the independent signal of the first station plus one-half the sum of the offset frequency and phase components and the phase commensurate with the propagation time between the first and second stations.

The present system in addition to being employed in any system requiring accurate time and phase information to be sent over relatively long distances is also employable as a long base interferometer receiving station.

A long base interferometer receiver comprises a plurality of widely separated antennae which supply a common signal receiver. The antennae are spaced from each other so that the phases of the signals received at each of them algebraically add when supplied to the receiver to produce a net signal only in response to certain signals arriving at the antennae base line within a very small predetermined angle. Any signals falling outside of this angle produce a net or average signal level of zero and produce no effect on the receiver.

When the present invention is employed as a long base line interferometer receiver, the signal received at each antenna is the independent input signal for the first station set forth supra. A first station is provided with each of the receiving antennas and transmits and receives energy from a point common to each. At the common point, the second station is positioned, one second station being provided for each of the first stations at the antennae. The phase between the signal received at the common point for each antennae is very accurately controlled relative to the phase of the signals received from each of the other antennae by the fixed distance between the first and second sites.

Also the present system may be employed as a long base line interferometer transmitter by placing the other stations at each antennae and the first stations adjacent to each other. The signal to be transmitted is applied in parallel to each of the first stations and the phase between the first and other stations is accurately maintained by the off-set oscillators and the fixed distance between the stations.

Atmospheric perturbations may also be measured by the system of the present invention. This is accomplished by employing an ultra stable high frequency oscillator at the first station and by measuring the correction voltage applied to the oscillators in the phase locked loop of either the first or other stations. The amplitude of the voltage is commensurate with the degree of perturbation.

In the past, phase information transmitted between remotely located stations has been limited greatly in that high frequency carriers could not be employed. In the present system, however, the fixed phase relationship between the stations is maintained as the carrier frequency is increased. Thus an increase in time resolution is obtained as the carrier frequency is increased because there is no phase resolution lost. The only limitation placed on the signal is with regard to the rate of information change rather than the frequency of the carrier.

It is an object of the present invention to provide a new and improved system for maintaining a fixed, finite, phase relationship between a plurality of remotely located stations.

It is another object of the present invention to provide a new and improved long base line interferometer receiver wherein the receiver angle of reception is controlled very accurately from a common point for each antennae.

It is a further object of the present invention to provide a new and improved long base line interferometer transmitter wherein control of the angle at which the energy is propagated from the transmitter is effected from a fixed, common point.

It is still another object of the present invention to provide a new and improved system to measure atmospheric perturbations by employing a pair of remotely located transmitting and receiving stations.

Another object of the present invention is to provide a transmitting and receiving system for maintaining a fixed, finite phase relationship between said stations by employing phase locked loops on both of such stations.

It is an additional object of the present invention to provide a new improved system for maintaining the phase between first and second remotely located transmitting and receiving stations at a substantially constant fixed value wherein the first station includes a phase locked loop for controlling the signal transmitted to the other station, said loop being responsive to an independent input signal and a reference signal having frequency and phase components proportional to the difference in the frequency and phase components between the transmitted signal from the first station and the received signal from the second station.

The above and still further objects, features and advantages of the present invention will become apparent upon consideration of the following detailed description of one specific embodiment thereof, especially when taken in conjunction with the accompanying drawings, wherein.

Figure 1:
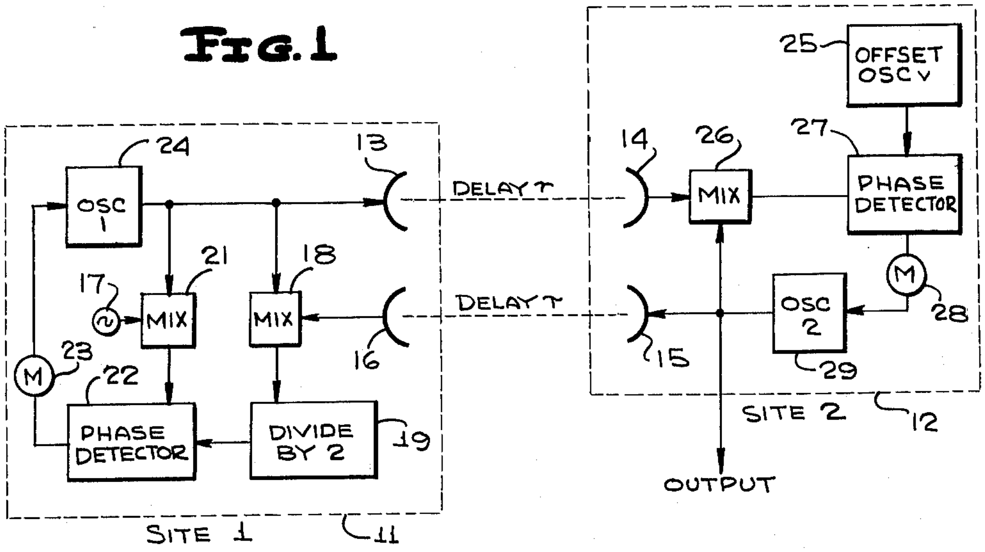
FIGURE 1 is a block diagram of the present invention wherein the phase between a pair of remotely located transmitters and receivers is accurately maintained at a fixed, finite value commensurate with an independent input signal.

Reference is now made to FIGURE 1 of the drawings which discloses a pair of remotely located transmitting and receiving stations 11 and 12. Station 11 includes antenna 13 for transmitting signals to receiving antenna 14 of station 12. The signal produced at station 12 is transmitted by antenna 15 to antenna 16 of station 11. The signal transmitted from station 11 by antenna 13 is derived from an independent input signal 17 and the signal received by antenna 16 from station 12. The output signal of antenna 16 is mixed in mixer 18 with the signal supplied to antenna 13. The mixer includes a band-pass filter for frequencies equal to the difference frequency between the signal received at antenna 16 and the signal transmitted by antenna 13. The output signal of mixer 18 is applied to frequency divider 19 which divides the input signal applied thereto by one-half.

The output signal of frequency divider 19 is applied to a phase locked loop as is input signal 17. The phase locked loop comprises mixer 21, responsive to the signal supplied to antenna 13 and the independent input signal 17. The mixer 21 includes a band-pass filter for accepting only the frequencies commensurate with the difference between signal source 17 and the signal applied to antenna 13. The reference signal derived from frequency divider 19 is applied to phase detector 22 as is the output of mixer 21. The phase detector 22 derives an output voltage commensurate in amplitude with the difference in the phase and frequency components of the signals applied thereto. Voltmeter 23 is connected in the output lead of phase detector 22 to measure the amplitude of the D.C. signal generated thereby. The output signal of phase detector 22 is coupled to voltage controlled oscillator 24 which generates a signal having frequency and phase components $K_1(t)$ equal to the difference in the phase and frequency components between the two input signals applied to phase detector 22. It can be shown that the phase and frequency components of $K_1(t)$ are equal to $2K_s(t)-K'_2(t)$, wherein $K_s(t)$ equals the phase and frequency components of signal 17 and $K'_2(t)$ equals the phase and frequency components of the signal received at antenna 16.

The signal propagated by antenna 13 to antenna 14 is transmitted over a propagation path having a delay time equal to $T_1$. Also the propagation path between antennae 15 and 16 provides a delay time $T_2$. The propagation path between antennae 13–15 is established by any propagation medium, such as a transmission line, free space, air, etc. It is expected that $T_1 \doteq T_2$ for virtually all conditions of use.

At station 12, the signal received by antenna 14 from antenna 13 is combined with the output signal of an offset oscillator 25 in a phase locked loop including mixer 26, phase detector 27 and voltage controlled oscillator 29. The signal received by antenna 14 is combined with the phase locked loop output in mixer 26 which includes a band pass filter for deriving a signal commensurate only with the difference side band between the signals applied thereto. The mixer 26 output signal is combined with the output signal of offset oscillator 25 in phase detector 27 which generates a D.C. voltage commensurate with the phase and frequency differences of the signals applied thereto.

The D.C. output of phase detector 27 is applied to voltmeter 28 and as the frequency control signal for voltage controlled oscillator 29. Oscillator 29 derives an output voltage $K_2(t)$ which is employed as the output signal of station 12 to provide the information indicative of the phase of signal 17. The output signal of oscillator 29 is applied to transmitting antenna 15 as well as to mixer 26. Oscillator 29 generates a signal wave having frequency and phase components which maintain the frequency and phase components applied to phase detector 27 equal. Thus, the frequency and phase components derived from oscillator 29 are equal to $K_v(t)+K_1'(t)$; where $K_v(t)$ equals the frequency and phase components of oscillator 25 and $K_1'(t)$ equals the frequency and phase components of the signal received at antenna 14 from antenna 13. Due to the phase shift introduced by the delay in the propagation paths between stations 11 and 12, $K_1(t)$ equals $K_1(t-T)$ and $K'_2$ equals $K_2(t-T)$ where T is the phase shift introduced by the propagation time between stations 11 and 12. It can therefore be shown that $$K_1(t)=K_s(t+T)-\tfrac{1}{2}K_v(t-T)$$

and that $K_2(t)=K_s(t)+\tfrac{1}{2}K_v(t+T)$. Since $K_v$ and T are known, the oscillator 29 output signal may then be detected in frequency and phase in accordance with the signal 17 applied to station 11. If it is desired to maintain zero phase between stations 11 and 12, offset oscillator 25 is excluded and detector 27 generates a D.C. signal commensurate with the difference frequency generated by mixer 26.

The system of FIGURE 1 may be employed as a means for determining atmospheric perturbations on electrical signals travelling between remotely located stations 11 and 12 by supplying an ultra stable, constant phase signal to mixer 21 from signal source 17. The voltage amplitudes of phase detectors 22 and 27 are measured by meters 23 and 28, respectively to provide information indicative of the atmospheric perturbations between signal sources. As the amount of protuberance increases, the phase detector output likewise increases to provide a ready means for determining the degree which interfering sources effect the signals propagated between the two stations.

Figures 2, 3:
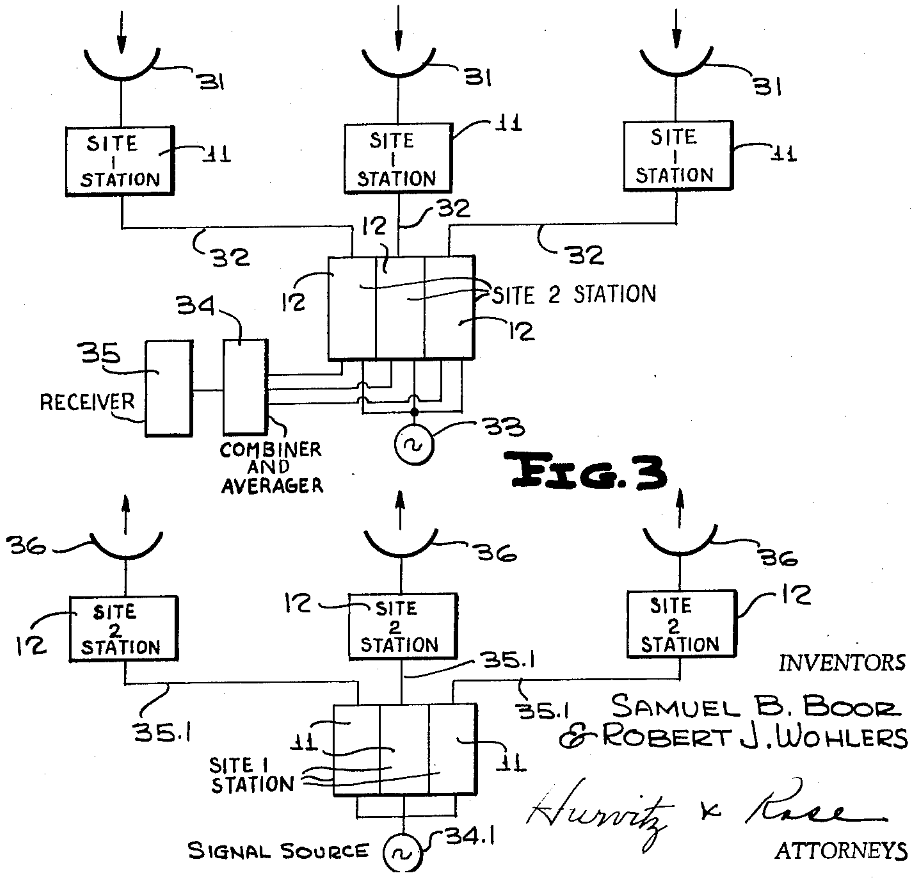
FIGURE 2 is an illustration of how the apparatus of FIGURE 1 is employed as a long base line interferometer receiver.
FIGURE 3 is a schematic diagram of how the apparatus of FIGURE 1 is employed as a long base line interferometer transmitter.

Reference is now made to FIGURE 2 of the drawings which discloses a long base line interferometer receiver comprising receiving stations 11 separated from each other by a substantial distance, for example, 12 miles between the stations located at either end of the base line. Each of the stations 11 includes an antenna 31 responsive to electromagnetic energy propagated from a remote source. Each of the stations 11 is coupled via transmission lines 32 to one of the stations 12 which are adjacently located. Each of the stations 12 is supplied with a common offset frequency from oscillator 33 and supplies its output signal to combiner and averager 34. The signals supplied to combiner and averager 34 are algebraically added and the resultant is averaged so that signals having a net value of zero produces no output therefrom. The output signal of unit 34 is applied to receiver 35 which produces an intelligence signal commensurate with the intelligence received by antennae 31.

Antennae 31 are spaced from each other on the base line comprising stations 11 so that only signals received within a very small solid angle produce an output from unit 34. All signals outside of the solid angle which the unit 34 is designed to be responsive are cancelled out because of the relative phase introduced between the respective stations 11 and stations 12. The intelligence signal received by antennae 31 is applied as the input signal 17 to mixer 21 of each of the stations 11. The output of oscillator 24, supplied to antenna 13 in FIGURE 1, is coupled to mixer 26 of station 12 via each of the transmission lines 32. The output signals of each of the oscillators 29, indicative of the signal received by the respective antennae 31 plus a constant phase shift introduced by the offset oscillator 33 and the delay introduced by each of the transmission lines 32 is coupled to adder-averager 34. Also the output signal of oscillator 29, coupled to antenna 15 in FIGURE 1, is fed back to station 11 via transmission lines 32 in the apparatus of FIGURE 2. Since the time delay introduced by each of the transmission lines 32 may be accurately controlled the relative phases of the signals derived from stations 12 and supplied to adder and averager 34 are accurately controlled. Typical interferometer pointing accuracies obtainable with the apparatus of FIGURE 2 are $5\times10^{-3}$ seconds of solid angle at S band with the specified separation between the stations 11 or $5\times10^{-4}$ seconds of solid angle at K band with the stations 11 positioned the same distance apart as for S band.

Reference is now made to FIGURE 3 of the drawings which discloses a long base line interferometer transmitter employing the apparatus of the present invention. A signal to be transmitted at a very small solid angle is coupled as the input signals to adjacent stations 11 from source 34.1. The output signal of each of the stations 11 derived from oscillator 24 is coupled via transmission lines 35.1 to its respective station 12. Stations 12 are positioned along the base line of the transmitter. When three transmitters are employed, as illustrated in FIGURE 3, each may be separated by a distance of X miles so that a 2X mile base is provided between the extreme left and right stations 12. The output signal from each station 12, as derived from oscillator 29, is applied to its respective antennae 36. The output of oscillator 29 is fed to transmission line 35.1 which couples it back to mixer 18 of station 11. The phase of the signals emanating from antennae 36 is accurately controlled by means of the offset oscillator 25 included in each of the stations 12 and the delay time introduced by each of the transmission lines 35.1. While each of the transmission lines 35.1 may be thought of as including two separate transmission pairs, one for transmitting signals between stations 11 and 12 and another for transmitting signals from station 12 to station 11, it is to be understood that a single transmission line or antenna pair is utilized as each line 35.1.

Because of the accuracy of the relative phases derived from each of the antennae 36, the signals transmitted thereby combine in free space in a very narrow solid angle. At all other angles, cancellation of signals takes place and no net signal is transmitted. With the apparatus of FIGURE 3, it is therefore possible to direct the intelligence of signal source 34.1 to a very specific point and exclude all other points not lying in the solid angle subtended by the combined electromagnetic energy of antennae 36.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for maintaining a fixed, finite phase relationship between first and second remotely located transmitting and receiving stations, the energy propagation times between said stations being substantially equal, said first station including an independent signal source, said second station including an offset frequency source, said first station comprising means responsive to the independent input signal and the received signal applied to it from said second station for transmitting a wave having frequency and phase components $$K_1(t)=K_s(t+T)-\tfrac{1}{2}K_v(t+T)$$

where $K_s(t)$=the frequency and phase of the independent input signal, $K_v(t)$=frequency and phase of the offset source and T is the propagation time between the first and second stations, said second station comprising means responsive to the wave transmitted by said first station and to the offset frequency source for generating a wave having a frequency and phase component $$K_2(t)=K_s(t)+\tfrac{1}{2}K_v(t+T)$$

the wave generated by said second station being received at said first station as the received signal from said second station but delayed by the time T.

2. In a system for maintaining a fixed, finite phase relationship between remotely located transmitting and receiving stations, the energy propagation times between said stations being substantially equal, said first station comprising; an independent signal source, means responsive to the wave transmitted by said first station and the wave received from said second station for generating a reference wave having frequency and phase components proportional to $K_1(t)-K_2'(t)$, where $K_1(t)$= the frequency and phase components of the wave transmitted by the first station and $K_2'(t)$=the frequency and phase components of the wave received at the first station from the second station, means responsive to the wave transmitted by said first station and the independent source for generating another wave having frequency and phase components proportional to $K_s(t)-K_1(t)$, where $K_s(t)$= the frequency and phase components of the independent source, and means responsive to said reference and another waves for maintaining the phase and frequency components of the transmitted wave $$K_1(t)=2K_2(t)-K_2'(t)$$

3. In a system for maintaining a fixed, finite phase relationship between remotely located transmitting and receiving stations, the energery propagation times between said stations being substantially equal, said first station comprising; an independent signal source, means responsive to the wave transmitted by said first station and the wave received from said second station for generating a reference wave having frequency and phase components proportional to $K_1(t)-K_2'(t)$, where $K_1(t)$=the frequency and phase components of the wave transmitted by the first station and $K_2'(t)$=the frequency and phase components of the wave received at the first station from the second station, means responsive to the wave transmitted by said first station and the independent source for generating another wave having frequency and phase components proportional to $K_s(t)-K_1(t)$, where $K_s(t)$= the frequency and phase components of the independent source, and means responsive to said reference and another waves for maintaining the phase and frequency components of the reference and another waves substantially equal, said last named means including a frequency divider responsive to $K_s(t)-K_1(t)$.

4. A system for maintaining a fixed, finite phase relationship between remotely located transmitting and receiving stations, the energy propagation times between said stations being substantially equal; said first station comprising an independent signal source, means responsive to the wave transmitted thereby and the wave received from said second station for generating a reference wave having frequency and phase components proportional to $K_1(t)-K_2'(t)$, where $K_1(t)$=the frequency and phase components of the wave transmitted by the first station and $K_2'(t)$=the frequency and phase components of the wave received at the first station from the second station, means responsive to the wave transmitted by said first station and the independent source for generating another wave having frequency and phase components proportional to $K_s(t)-K_1(t)$, where $K_s(t)$=the frequency and phase components of the independent source, and means responsive to said reference and another waves for maintaining the phase and frequency components of the transmitted wave $K_1(t)=2K_2(t)-K_2'(t)$; said second station comprising an offset frequency source, means responsive to said offset source and the received signal from said first station for transmitting a wave to said first station, the wave transmitted by said second station having frequency and phase components $$K_2(t)=K_1(t-T)+K_v(t)$$

wherein T is the propagation time between the first and second stations and $K_v(t)$ is the frequency and phase components of the offset source.

5. The system of claim 4 wherein said second station includes a phase locked oscillator loop.

6. A system for maintaining a finite, fixed phase relation between first and second remotely located transmitting stations, the paths between said stations having substantially equal energy propagation times; said first station comprising an independent signal source, means for deriving a reference wave having frequency and phase components, $K_r(t)$, proportional to $K_2'(t)-K_1(t)$, wherein $K_2'(t)$=the frequency and phase components of the wave received at the first station in response to the wave transmitted from the second station, $K_1(t)$=the frequency and phase components of the wave transmitted from the first station, a phase locked loop responsive to the reference wave and the independent signal for generating the wave having frequency and phase components $K_1(t)$; said second station comprising an offset frequency source, and a phase locked loop responsive to the signal received from said first station and the offset source for generating the wave transmitted to the first station.

7. The system of claim 6 wherein the proportionality factor of the components of the reference wave is ½.

8. A long base line interferometer receiver system comprising a plurality of receiving stations responsive to an independent, received signal, said stations being remotely located along the line, a plurality of adjacently located other stations, one of said other stations for each of said receiving stations, each of said other stations including an offset frequency signal source, said receiving and other stations including means for transmitting and receiving energy to and from its associated station, each of said receiving stations including means responsive to the independent signal received thereby and the signal received from its associated other station for generating a signal having frequency and phase components equal to $K_s(t+T)-\frac{1}{2}K_v(t+T)$, where $K_s(t)$ is the frequency and phase components of the independent signal received by the receiving station, $K_v(t)$ is the frequency and phase components of the offset frequent for the other station associated with the receiving station, and T is the propagation time between the other station and its associated receiving station, each of said other stations including means responsive to the offset frequency signal source and the received signal from its associated receiver station for transmitting a signal to its associated receiver station having frequency and phase components equal to $K_s(t)+\frac{1}{2}K_v(t+T)$.

9. The system of claim 8 wherein said offset source is common to each of said other stations.

10. A long base line interferometer transmitter comprising a plurality of transmitting stations remotely located along the line, a plurality of adjacently located other stations, one of said other stations for each of said receiving stations, each of said transmitting stations including an offset frequency signal source, said receiving and other stations including means for transmitting and receiving energy to and from its associated station, each of said other stations including means responsive to an independent signal and the signal received from its associated transmitting station for generating a signal having frequency and phase components equal to $$K_S(t+T)-\frac{1}{2}K_V(t+T)$$

where $K_s(t)$ are the frequency and phase components of the independent signal, $K_v(t)$ are the frequency and phase components of the offset frequency for the transmitting station associated with the other station, and T is the propagation time between the transmitting station and its associated other station, each of said other stations including means responsive to the offset frequency signal source and the received signal from its associated other station for transmitting a signal to its associated other station having frequency and phase components equal to $K_S(t)+\frac{1}{2}K_V(t+T)$.

11. A system for measuring atmospheric perturbations between first and second remotely located transmitting and receiving stations, each of said stations including means for transmitting and receiving energy through the atmosphere to and from the other station; said first station comprising; and independent signal source, means for deriving a reference wave having frequency and phase components, $K_r(t)$, proportional to $K_2'(t)-K_1(t)$, wherein $K_2'(t)$= the frequency and phase components of the wave received at the first station in response to the wave transmitted from the second station, $K_1(t)$= the frequency and phase components of the wave transmitted from the first station, a phase locked loop responsive to the reference wave and the independent signal for generating the wave having frequency and phase components $K_1(t)$; said second station comprising an offset frequency source, and a phase locked loop responsive to the signal received from said first station and the offset source for generating the wave transmitted to the first station, the phase locked loop of said first station including means for deriving an indicating signal varying in amplitude in response to $K_r(t)=K_s(t)-K_1(t)$, and means for measuring the amplitude of said indicating signal.

12. A system for measuring atmospheric perturbations between first and second remotely located transmitting and receiving stations, each of said stations including means for transmitting and receiving energy through the atmosphere to and from the other station; said first station comprising; an independent signal source, means for deriving a reference wave having frequency and phase components, $K_r(t)$, proportional to $K_2'(t)-K_1(t)$, wherein $K_2'(t)$=the frequency and phase components of the wave received at the first station in response to the wave transmitted from the second station, $K_1(t)$=the frequency and phase components of the wave transmitted from the first station, a phase locked loop responsive to the reference wave and the independent signal for generating the wave having frequency and phase components $K_1(t)$; said second station comprising an offset frequency source, and a phase locked loop responsive to the signal received from said first station and the offset source for generating the wave transmitted to the first station, the phase locked loop of said second station including means for deriving an indicating signal varying in amplitude in response to $$K_v(t)=K_2(t)-K_1'(t)$$

wherein $K_v(t)$ is the frequency and phase components of the offset source, $K_2(t)$ is the frequency and phase components of the signal transmitted at the second station, and $K_1'(t)$ is the signal received at the second station from the first station, and means for measuring the amplitude of said indicating signal.

13. A system for maintaining a finite, fixed phase relation between first and second remotely located transmitting stations, the paths between said stations having substantially equal energy propagation times; said first station comprising; an independent signal source, means for deriving a reference wave having frequency and phase components, $K_r(t)$, proportional to $K_2'(t)—K_1(t)$, wherein $K_2'(t)$=the frequency and phase components of the wave received at the first station in response to the wave transmitted from the second station, $K_1(t)$=the frequency and phase components of the wave transmitted from the first station, a phase locked loop responsive to the reference wave and the independent signal for generating the wave having frequency and phase components $K_1(t)$; said second station including a phase locked loop responsive to the signal received from the first station for generating the wave transmitted to the first station, said loop of said second station including means for maintaining a fixed, predetermined phase relation between the signals received and transmitted thereby.

14. A system for maintaining a fixed phase relation between a pair of remotely located stations having transmission paths of substantially equal propagation times, T, between them, the first of said stations including means for transmitting a first wave; the second of said stations including; means for receiving the first wave transmitted from said first station, a source of constant frequency, offset waves, first heterodyning means for deriving a first sideband in response to said offset wave and said received first wave, and means for transmitting said sideband; the first of said stations including; means for receiving the sideband transmitted from the second station as a second wave, means for mixing said first and second waves to derive a difference frequency, means for dividing the difference frequency by one half to derive a reference wave, an independent signal source, second heterodyning means for deriving a second sideband in repsonse to said reference wave and said independent signal source, and means for coupling said second sideband to the transmitting means of the first station, said second sideband being transmitted from said first station as said first wave.

15. A long base line interferometer receiver system comprising a plurality of receiving stations responsive to an independent, received signal, said stations being remotely located along the line, a plurality of adjacently located other stations, one of said other stations for each of said receiving stations, each of said receiving stations including means for transmitting a first wave; each of said other stations including; means for receiving the first wave transmitted from its associated receiving station, a source of constant frequency, offset waves, first heterodyning means for deriving a first sideband in response to said offset wave and said received first wave, and means for transmitting said sideband; the first of said stations including; means for receiving the sideband transmitted from its associated second station as a second wave, means for mixing said first and second waves to derive a difference frequency, means for dividing the difference frequency by one half to derive a reference wave, an independent signal source, second heterodyning means for deriving a second sideband in response to said reference wave and said independent signal source, and means for coupling said second sideband to the transmitting means of the receiving station, said second sideband being transmitted from said receiving station as said first wave.

16. A system for maintaining a fixed phase relation between a pair of remotely located stations, having transmission paths of substantially equal propagation time, T, between them, the first of said stations comprising means for transmitting a first wave to said second station, means for receiving a second wave from said second station, means for mixing said first and second waves to derive a difference frequency, means for dividing the difference frequency by one half to derive a reference wave, an independent signal source, heterodyning means for deriving a sideband in response to said reference wave and said independent signal source, and means for coupling said sideband to the transmitting means of the first station, said sideband being transmitted from said station as said first wave.

References Cited by the Examiner

UNITED STATES PATENTS

| | | | |
|---|---|---|---|
| 2,435,259 | 2/1948 | Wilder et al. | 343—179 |
| 2,460,781 | 2/1949 | Cantelo | 325—17 |
| 2,747,083 | 5/1956 | Guanella | 325—132 |
| 2,958,768 | 11/1960 | Brauer | 343—179 |
| 3,079,557 | 2/1963 | Crabtree | 343—175 |
| 3,090,955 | 5/1963 | Hubka et al. | 325—67 |

DAVID G. REDINBAUGH, *Primary Examiner.*